(12) United States Patent
Napper

(10) Patent No.: US 6,652,733 B2
(45) Date of Patent: Nov. 25, 2003

(54) METHOD OF OPERATING A REACTOR FOR REMOVING IMPURITIES BY ELECTROCHEMICAL MEANS

(75) Inventor: David Napper, Haderslev (DK)

(73) Assignee: Adept Technologies A/S, Hardeslev (DK)

( * ) Notice: Subject to any disclaimer, the term of this patent is extended or adjusted under 35 U.S.C. 154(b) by 0 days.

(21) Appl. No.: 09/949,905

(22) Filed: Sep. 10, 2001

(65) Prior Publication Data

US 2002/0029976 A1 Mar. 14, 2002

Related U.S. Application Data

(62) Division of application No. 09/420,469, filed on Oct. 19, 1999, now Pat. No. 6,309,519.

(30) Foreign Application Priority Data

Oct. 20, 1998 (GB) ............................................ 9822958

(51) Int. Cl.[7] .............................. C25B 15/02; C25C 1/00
(52) U.S. Cl. .................... 205/335; 205/743; 210/748
(58) Field of Search .................... 210/748; 205/743, 205/335; 204/661, 668, 672

(56) References Cited

U.S. PATENT DOCUMENTS

| | | |
|---|---|---|
| 3,577,336 A | 5/1971 | Shirley |
| 4,057,482 A | 11/1977 | Candor |
| 5,536,389 A | 7/1996 | La Naour et al. |
| 5,741,426 A * | 4/1998 | McCabe et al. ............. 210/707 |
| 5,807,473 A | 9/1998 | Sadler et al. |
| 5,858,201 A | 1/1999 | Otsuka et al. |
| 5,891,315 A | 4/1999 | Nash |

FOREIGN PATENT DOCUMENTS

| | | |
|---|---|---|
| EP | 129523 | 12/1984 |
| GB | 2054652 | 2/1981 |
| GB | 2238059 | 5/1991 |

OTHER PUBLICATIONS

WPI Accession No. 96–186733/19 & RU 2042640 C1 (Dakhina) see abstract. Aug. 1995.
WPI Accession No. 86–099580/15 & SU 1180356 A (Budris) see abstract. Sep. 1985.
WPI Accession No. 82–83010E/39 & SU 864741 B (Kharkov) see abstract Apr. 1982.

* cited by examiner

Primary Examiner—Roy King
Assistant Examiner—Wesley A. Nicolas
(74) Attorney, Agent, or Firm—Andrus, Sceales, Starke & Sawall, LLP

(57) ABSTRACT

A method of operating a reactor for removing impurities by electrochemical means from liquids, such as aqueous solutions. The liquid is passed through series of plateshaped reaction electrodes electrically insulated against each other with a liquid speed above a minimum to prevent dissociation into constituent gases, but sufficient to ensure interaction with an electrical current passing between the plateshaped electrodes. The latter has corrugated forms and/or their surfaces provided with embossed relief patterns to enhance the electrochemical effect between the electrodes. The conductivity of the treated liquid, the organic contents of the liquid and the flow of the liquid is measured and the length of the flow path for the liquid in the reactor is established in dependence on the measured parameters. Ultrasonic vibrations are generated in the flow path for stimulating a reaction process.

8 Claims, 7 Drawing Sheets

METHOD OF OPERATING A REACTOR FOR REMOVING IMPURITIES BY ELECTROCHEMICAL MEANS

CROSS REFERENCE TO RELATED APPLICATION

The present application is a divisional application of U.S. patent application Ser. No. 09/420,469, filed Oct. 19, 1999, now U.S. Pat. No. 6,309,519, issued Oct. 30, 2001. This application and the parent application claim the priority of UK patent application 9822958.6, filed Oct. 20, 1998.

The invention relates to a reactor for treating liquids with a view to remove impurities by electrochemical means.

Liquids such as waste water have traditionally been cleaned by means of chemical and biological treatment and sedimentation. Oxidation is performed in aerators, and micro-organisms will deal with nutrient salts as well as with heavy metal ions. These processes are not difficult to perform but they require large plants and considerable process time. Hence they are frequently performed on waste water and not on fresh water pumped up for consumption or on surface water. For waste water it has become standard practice to perform membrane filtration, for example in the form of reverse osmosis for salt removal and micro filtration for removal of micro-organisms. Sometimes chlorination, UV-radiation and ozonification is used. Such plants are, however, very complex, and their working pressures have to be large which puts heavy requirements on the pumps involved. Hitherto known purifying plants are normally constructed according to the removal of specific impurities, and modifications to perform optimally for other impurities, which may appear, are complex and time consuming.

Production enterprises have today to pay for the degree of pollution of their effluents which often represents a significant expense in production operation and involve the costs of the installation of large purification facilities within the production plant in question.

There is hence a hitherto unfilled need for an apparatus or reactor which is easily adaptable to changing purifying requirements and which does not require large plants of very high operating pressures.

It is known that electrochemical processes may have a biocidal effect on the bacteria content in a treated liquid due to the electrical current. It is also well known to produce a mechanical, catalytic and magnetic stimulation of the oxidation/reduction processes of organic substances in waste water. By using a reactor with a heterogeneous electro-chemical action it is feasible to solve the problems outlined above. However, existing equipment which is available for electrochemical processes is designed for the synthesis of organic or metallo-organic compounds and is not well suited for treating large volume flows of liquid, such as waste water. Mere re-configuration of equipment of the known type to achieve this aim has not hitherto proved economical.

BRIEF DESCRIPTION OF THE INVENTION

It is therefore a purpose invention to provide an apparatus or reactor which is well suited to the purifying processes envisaged and which is adaptable to a wide range of flows and effluent parameters and in which it is simple to provide further specific functionalities for existing purifying plants.

This is obtained by means of a reactor according to the invention in a process in which the liquid, such an aqueous solution, is passed between a series of plateshaped, corrugated reaction electrodes with a volume speed which is above a minimum to prevent dissociation into constituent gases but sufficient to ensure interaction with an electrical current passing between the reaction electrodes, which are electrically insulated against each other, the reactor being particular in that it comprises at least one and preferably more interconnected units with series of plateshaped electrodes, valve means and holes in the plates for redirecting the liquid flow into and through the series of reaction electrodes, and an automatic electronic control system consisting of a number of sensors at the liquid inlet of the reactor for measuring the conductivity of the treated liquid, the organic contents of the liquid and the flow (volume) of the liquid, means for transferring the measurements to a processor for further treatment, and means for transferring the output commands from the processor to the valve means for redirecting the liquid flow and for activating or deactivating the electrode unit or units in dependence on the measured parameters.

To enable simple, fast and efficient changes in the passing flow while using standardized electrode plates, a preferred embodiment of the invention is particular in that the electrical insulation between the plates is shaped as liquid tightening gasket sealings acting as manifolds and flow controllers. A further embodiment is particular in that the processor also includes means for adjusting the density of the electrical current passing between the plates.

Another advantageous embodiment in particular is that at least some electrode surfaces are coated with layers of catalytic compounds including pure metals.

In a further advantageous embodiment the electrochemical process plates are interspersed with heat exchanger plates to obtain a better temperature control of the process and to recover the heat from the treated liquid.

Yet another advantageous embodiment comprises the placement of separation membranes between one or more electrode pairs.

In a further advantageous embodiment specially shaped electromagnets are connected with some of the plateshaped electrodes to provide a magnetic field in the space between an electrode pair and thus stimulate the process between the plates.

In a further advantageous embodiment ultrasonic actuating devices are fitted into the manifolds of the single units to likewise stimulate the process between the plates of the unit in question thereby increasing the efficiency of the process. Gases are formed by the electro-chemical reaction between electrodes and if the gases are allowed to accumulate they get larger and larger with the result, that the gases generated to work in the process gets lost to the solution. By using ultrasound the gas bubbles are stimulated to expand and then implode, whereby the gases are returned to the solution. An additional advantage in this connection is a cleaning effect upon the electrodes during the process.

All the above embodiments allow for the inclusion of the reactor into existing heat exchanger installations of purifying systems for waste water in order to pre-process the effluent before it is lead into sewage systems, and due to its modest outer dimensions and simple construction principals the reactor provides thus a surprising new means for purifying of effluents.

BRIEF DESCRIPTION OF THE INVENTION

The invention will be further described in the following with reference to the accompanying drawings, in FIG. 1 schematically shows the built-up of a unit of plateshaped electro-chemical reactions electrodes with a lower liquid inlet and an upper liquid outlet;

DETAILED DESCRIPTION OF THE INVENTION

Figure 1:
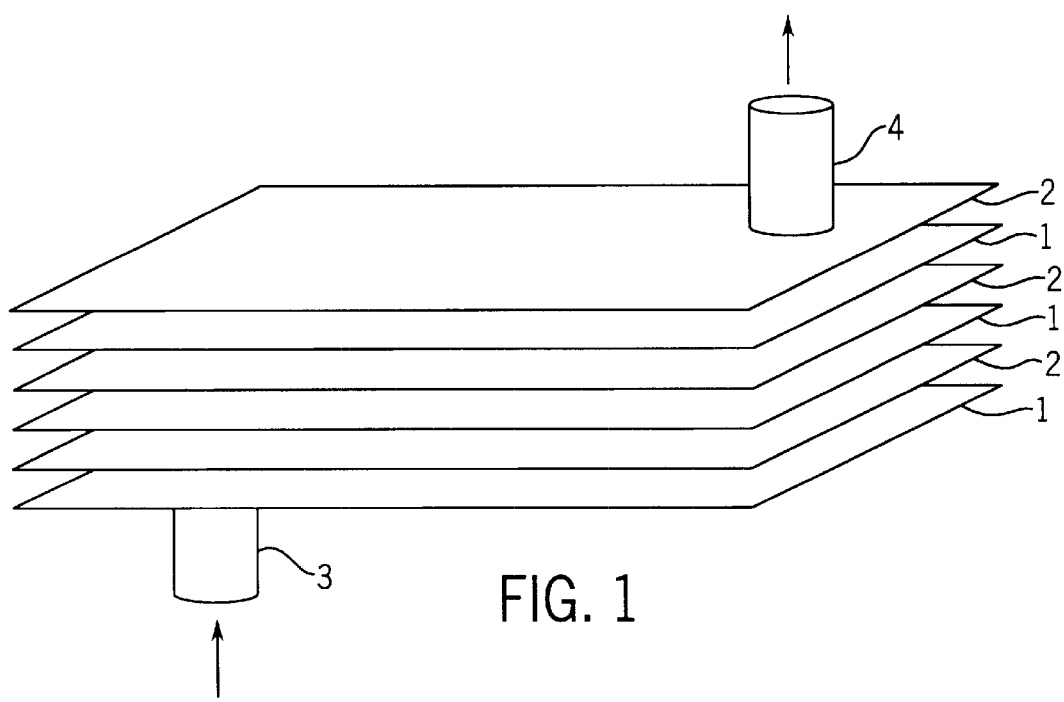

In FIG. 1 is shown the principle of the built-up of a unit of the reactor according to the invention, the unit comprising a number of plateshaped electrodes in the form of cathodes 1 with anodes 2 between the cathodes, a lower liquid inlet 3 and an upper liquid outlet 4. It will be seen from the figure that the unit built-up is very much alike the traditional construction of a plate heat exchanger, however, with the difference that the unit electrode plates advantageously are horizontally placed contrary to heat exchanger plates, which more often are vertically placed. This horizontal positioning of the electrode plates with lower liquid inlet 3 and the upper liquid outlet 4 is due to the fact that air bubbles occurring in the treated liquid in the reactor should be allowed to pass out of the system in a 'natural' way instead of harassing the purifying process. Tie rods (not shown) hold the stack of plates together between end plates to form the unit in the same way as in the construction of a plate heat exchanger.

Figure 2:
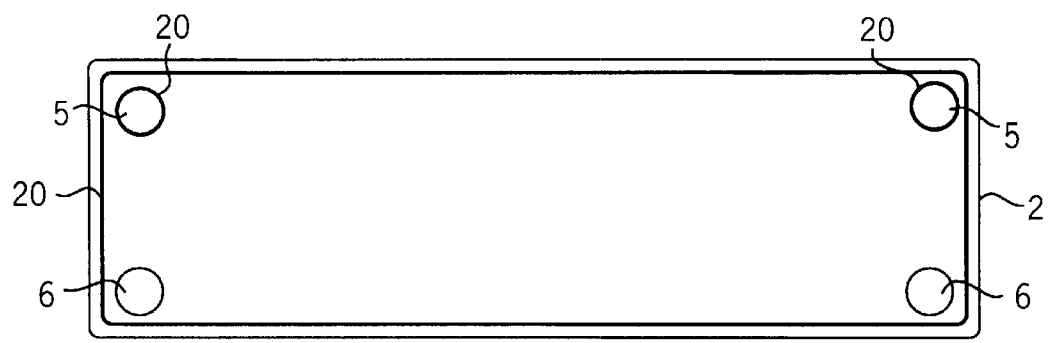
FIG. 2 shows a pair of plateshaped electrodes seen from the back and from the front, respectively.
Figure 2:
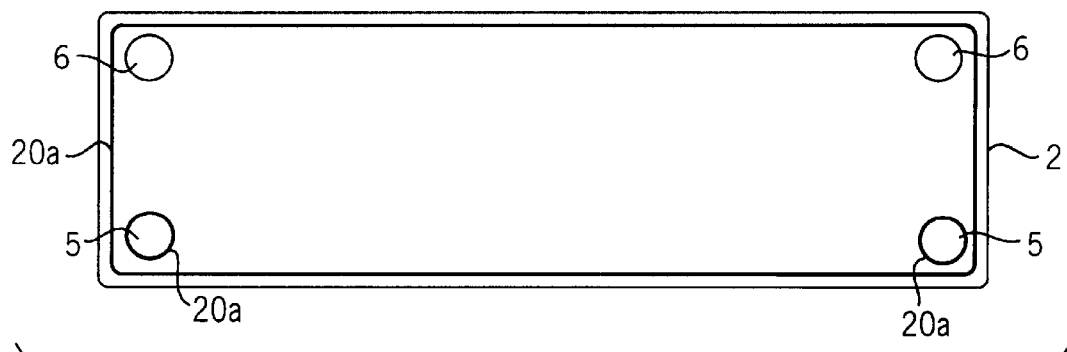

In FIG. 2 are shown two consecutive electrode plates 1 (lower surface) and 2 (upper surface). Ordinarily the plates have holes 5, 6 near each corner. With the plates mounted in a stack the holes represent a longitudinal flow passage through the stack or the unit and of a length which is equal to the height of the stack. Close to the periphery of each plate 1, 2 and around the holes 5 is a groove 20 in the upper surface of a plate for holding a liquid tightening and electrically insulating gasket 19 (cf. FIG. 4) and a corresponding rim 20a on the lower surface of the plate. When stacking the plates to form a unit and tighten the tie folds the gaskets 19 in the grooves 20 will press against the raised rims 20a upon the lower surfaces of the plates immediately above and be compressed to a liquid tightening seal. This construction ensures also that the edge effect 9 concentration of electrical potential) associated with electrode plates in an electrolyte is avoided, because the liquid is confined within the outer gaskets and eliminates thus a source of undesired process activity.

Ordinarily the plates have holes 5, 6 near each corner. A stack of holes represent a longitudinal flow passage of a length equal to the height of the stack which allows access to each space between adjacent plates 1, 2. However, if a gasket 19 surrounds a hole 5 the access from the flow passage into a space around the gasket is blocked, and the flow in that particular flow passage bypasses the space. The flow passage formed by the gasket blocked holes 5 is now acting as a manifold. In FIG. 2 a liquid flow in the space between the electrode plates 1 and 2 is therefore fully determined by the access holes 6 which act as source and drain or vice versa.

Figure 3:
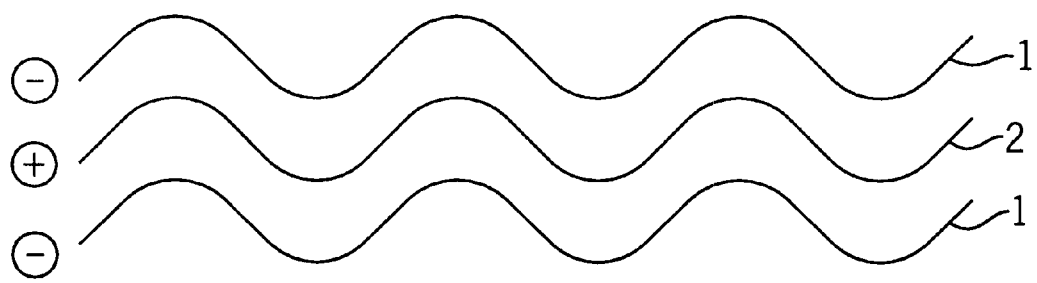
FIG. 3 shows schematically the relative positioning of two cathode plates above and below with a anode plate in between, all three plates being corrugated, and the appertaining process passages between the plates.

In FIG. 3 is schematically shown that the plates 1, 2 are preferentially corrugated to enhance a turbulence which will cause a constant and better mixing of the liquid mass during its transport between the plates. The plate surfaces may also be provided with the embossed relief patterns. This embodiment of the plates causes the passing liquid mass to be continuously moved into the 'clouds' of solvated electrons, radicals and ions associated with the respective electrodes. Furthermore, the process active area of each plate 1, 2 is increased by this embodiment of the plates. It also appears from this figure that a series of plateshaped electrodes comprises alternatingly mounted cathodes 1 and anodes 2, each plate being connected to an electrical source (not shown).

Figure 4:
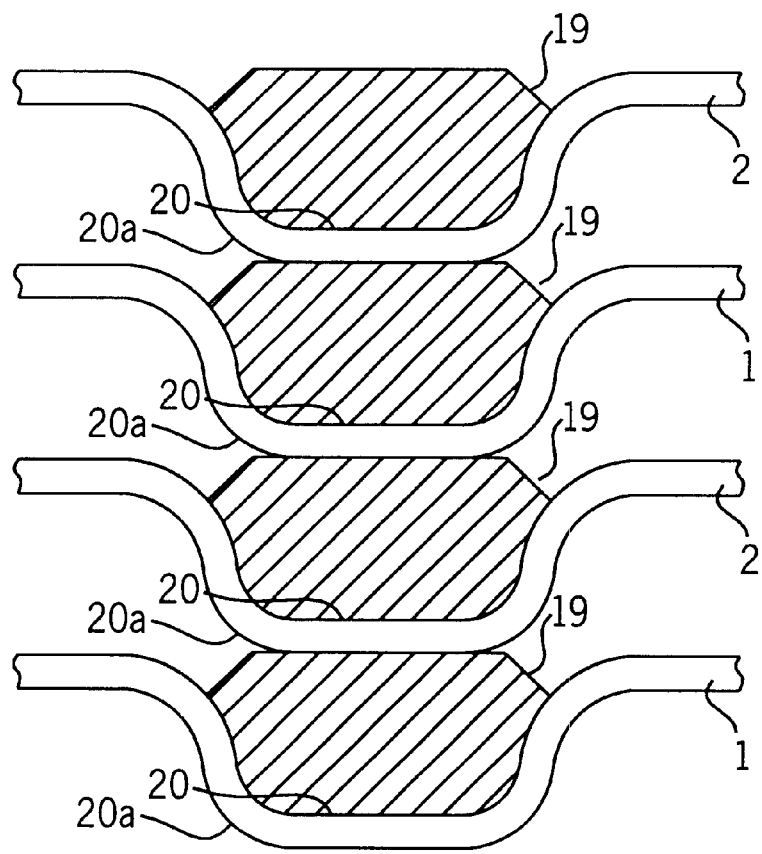
FIG. 4 shows a cross section of the placement of liquid sealing and electrically insulating gaskets between the plates.

FIG. 4 shows schematically and on enlarged scale a cross section of the fitting of sealing gaskets 19 in the respective plates 1, 2. The gaskets 19 are cemented in place in the groves 20 of the plates 1, 2 before assembling a stack of plates. When the stack hence is assembled by tightening the tie rods of the stack or unit the upper part of each gasket 19 is brought to rest against the rim 20a on the back surface of each foregoing plate and fixed by the compression caused by the tightening.

Figure 5:
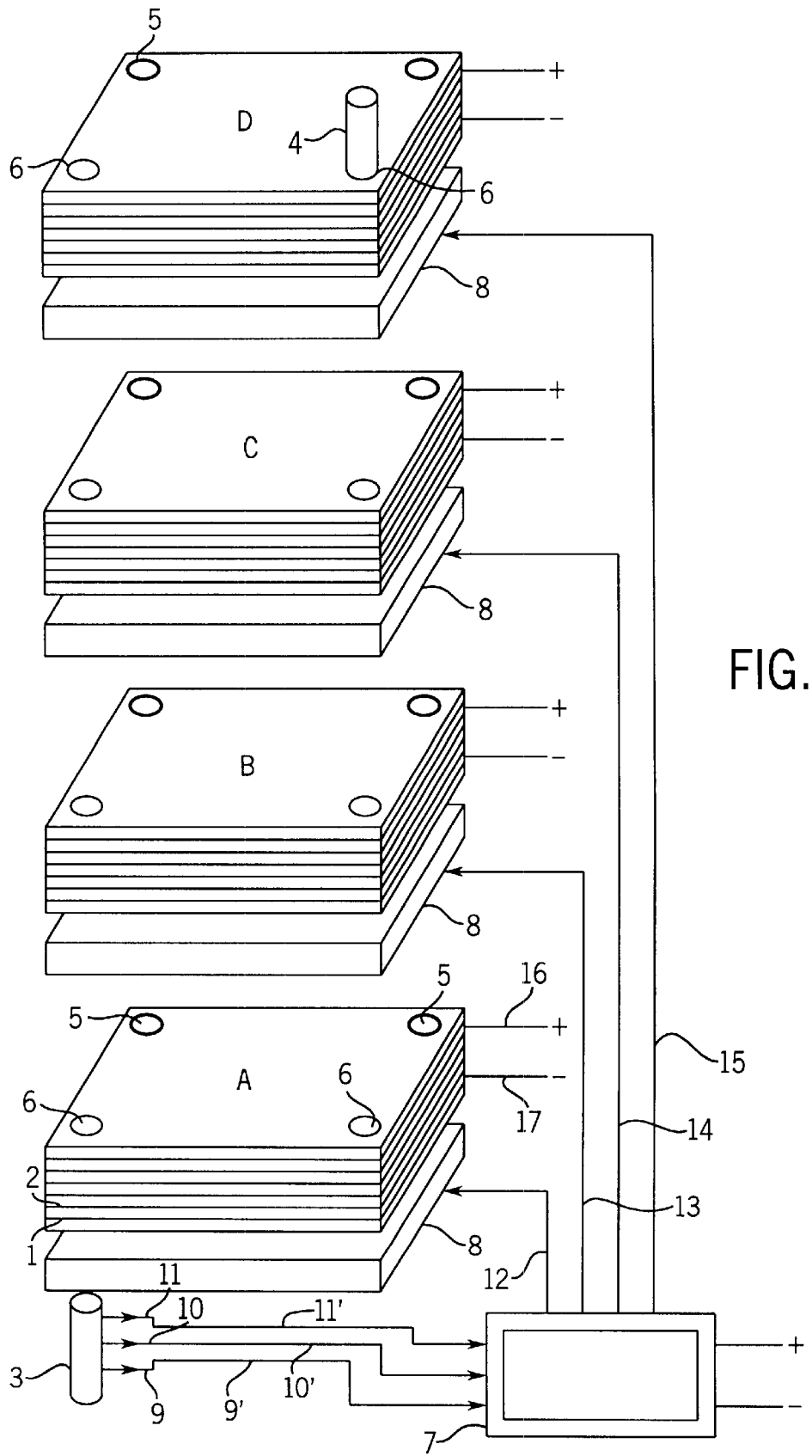
FIG. 5 shows diagrammatically and partly in an exploded view a reactor according to the invention comprising four interconnected units each with a number of plateshaped electrodes, valve means and a processor the automatic control of the reactor.

FIG. 5 shows diagrammatically and partly in an exploded view a preferred embodiment of the reactor according to the invention, the reactor comprising four interconnected units or stacks A, B, C, D of plate shaped electrodes 1, 2 mounted alternatingly in pairs of cathodes 1 and anodes 2, a reactor liquid inlet 3, a reactor liquid outlet 18 and each unit A, B, C, D having liquid flow passages 6 with access to the spaces between the plates and blocked liquid flow passages 5 acting as manifolds for bypassing liquid through the respective units. The electrode plates are provided with connections 16, 17 to a not shown electrical source. Immediately below each unit is mounted automatically controlled valve means 8 of a known construction for directing and redirecting the flows through the units A, B, C, D. The reactor comprises further a processor 7 connected by means 9', 10', 11' to sensors 9, 10, 11 mounted on the reactor inlet 3 for measuring the conductivity of the liquid fed to the reactor, the organic contents of the liquid and the flow (volume) of the liquid. After treatment of the measured parameters in the processor 7 the output data are sent through means 12, 13, 14, 15 as commands from the processor to the valve means 8 to direct and/or redirect the liquid flow through the units A, B, C, D in dependence on the measured parameters.

The processor 7 may include means (not shown) for the adjustment of the electrical current passing between the pairs of electrodes.

The electrode surfaces may be coated with various types of catalytic compounds including pure metals according to the substances it is desired to remove from the effluents. As appropriate coating materials thin layers of stainless steel, graphite, platinum and lead dioxide may be used.

Figure 6A:
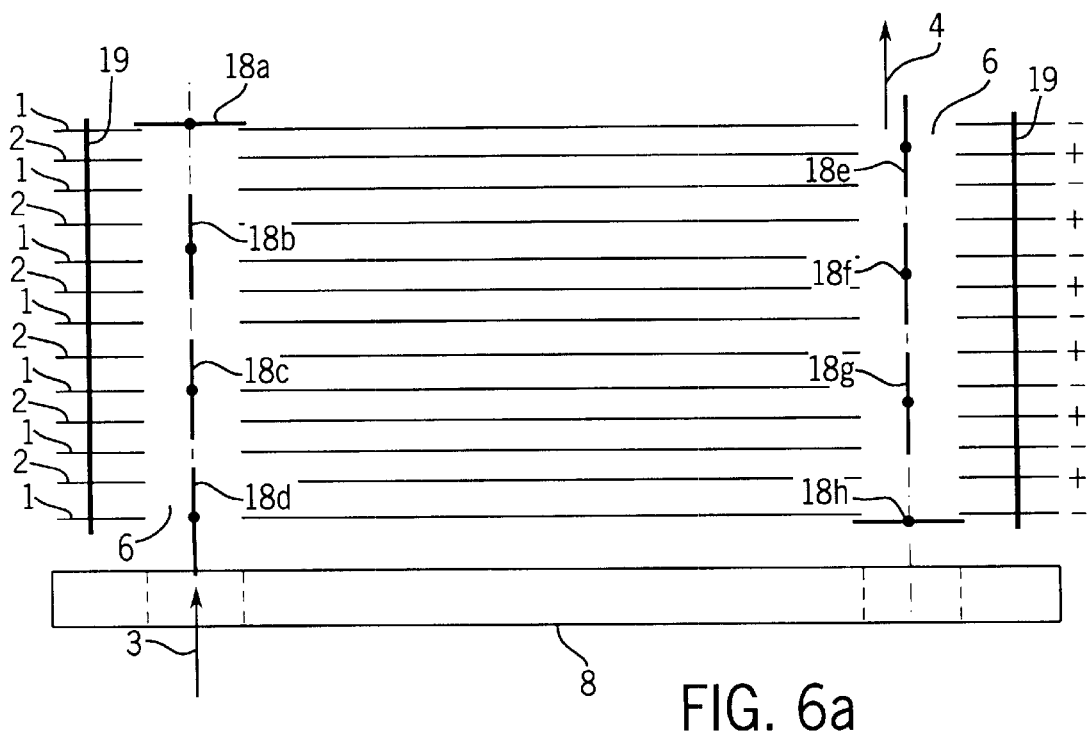
FIG. 6 shows diagrammatically and in cross section two examples of the positioning of the valve means.
Figure 6B:
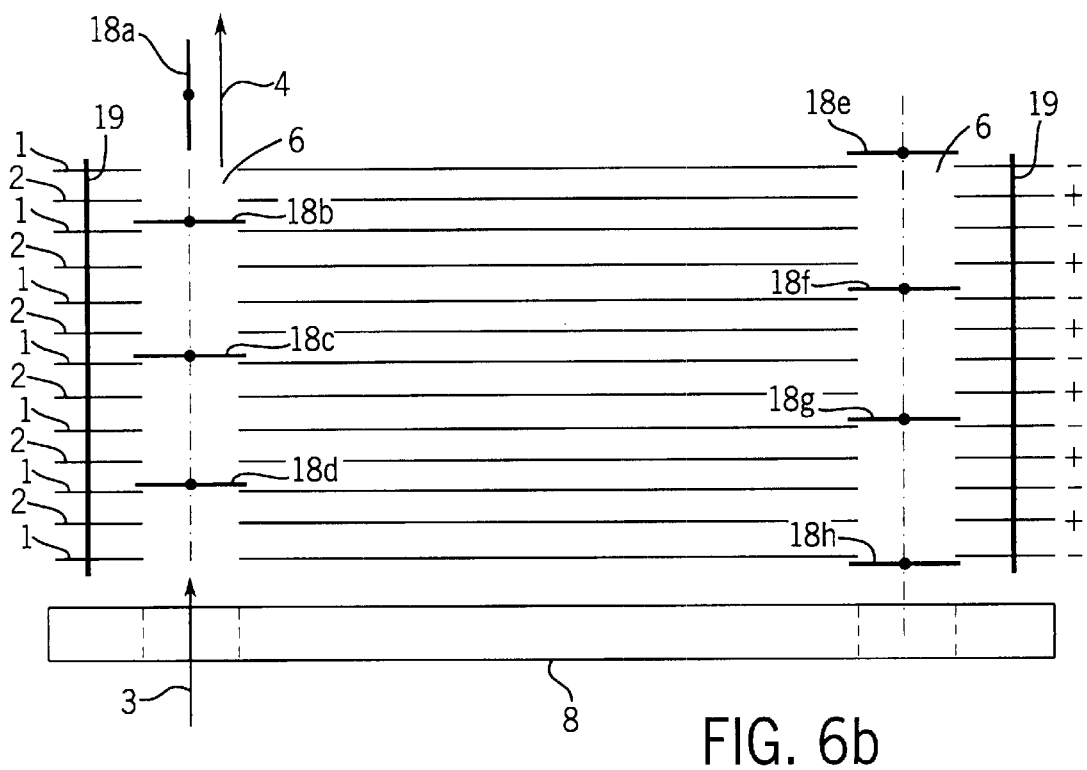

FIG. 6 shows in simplified diagrams the valve means principle within a stack or unit A, B, C, D of electrode plates 1, 2 (cf FIG. 5). As indicated in the right side of the FIGS. 6a and 6b the plates 1, 2 are cathodes (−) and anodes (+). The sealing and insulating gaskets 19 are shown at the ends of the plates 1, 2 and prevent any liquid flows around the plate ends. Valves 18a–18h are mounted in the liquid passages 6 which give liquid access to the spaces between the plates. The valves 18a–18h are controlled mechanically, electrically or hydraulically in a known manner via the valve body 8 immediately beneath each unit A, B, C, D, the body 8 receiving its electronic commands from the processor 7 (cf. FIG. 5). Two different valve positions are shown. In FIG. 6a the liquid enters via the inlet 3 and travels through passage 6 the entire depth of the stack. As the left passage is blocked at the top by valve 18a and as the parallel passage 6 at the right on the figure is blocked at the bottom by valve 18h and the remainder valves 18b–18g are all open the entire liquid mass moves horizontally from left passage 6 to right passage 6 and exits via outlet 4 above the right passage 6. The unit has full liquid flow, but a given mass of liquid passes only once between a cathode/anode pair.

In FIG. 6b all valves 18b–18h are closed and only valve 18a in left passage 6 is open. Hence the liquid flow entering through inlet 3 is constantly redirected by the valves during its passage of the unit, so that a given mass of liquid passes between cathode/anode pairs 1, 2 six times. The treating effect of this unit is therefore here six times as great as the treating effect in the foregoing example, but the flow is inversely proportional.

Figure 7:
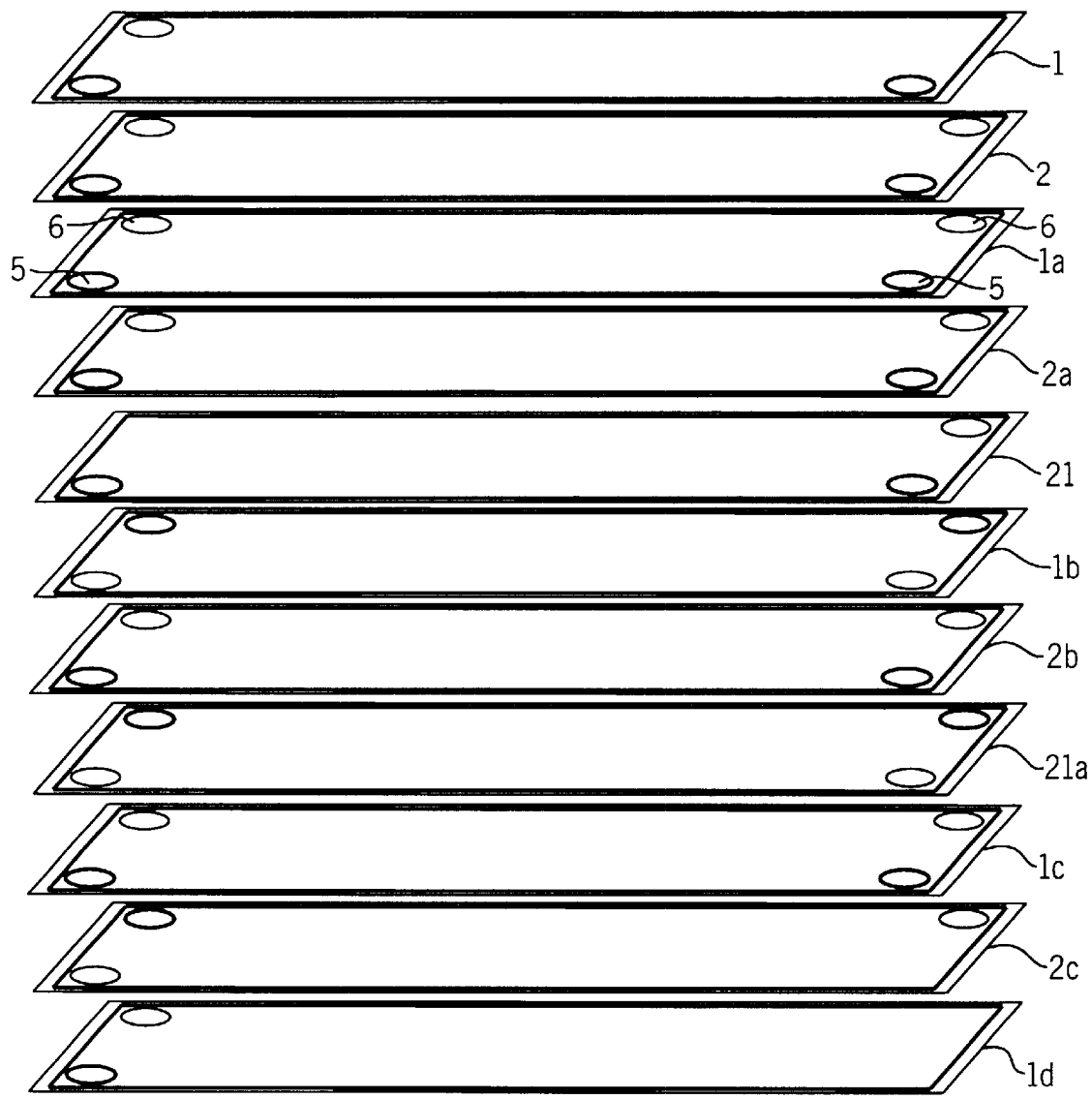
FIG. 7 shows schematically the built-up of the electrode plates in a unit with interspersed heat exchanger plates.

FIG. 7 shows a stack of electrode plates with cathodes 1, 1a, 1b, 1c, 1d alternating with anodes 2, 2a, 2b, 2c, where heat exchanger plates 21 and 21a are interspersed between electrode pairs 2a–1b and 2b–1c, respectively, to obtain a better temperature control of the process between the plates and to recover heat from the process for further use within the plant of which the reactor according to the invention is part.

Figure 8:
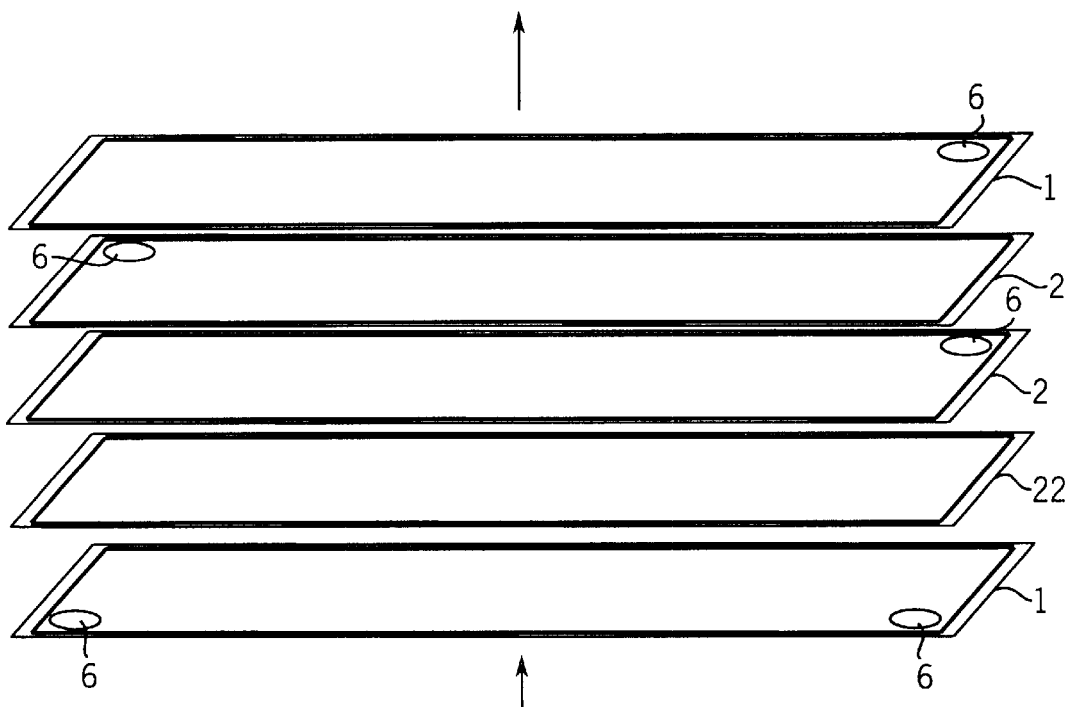
FIG. 8 shows schematically the positioning of membranes between the electrode plates in a unit.

FIG. 8 shows a stack of electrodes 1, 2 in which membranes 22 are fitted between the electrode pairs. As membranes may be used semi-permeable membranes known per se for the separation of molecules and ions in liquid form or as gas from the process. The latter will in many cases liberate gases and the creation of a vacuum occurring above a membrane connected to a particular electrode may remove the gases produced. Membranes may also be used to only allow for the transport of electrons and specific ions through the space between an electrode pair according to any special requirements for the purifying process.

Figure 9:
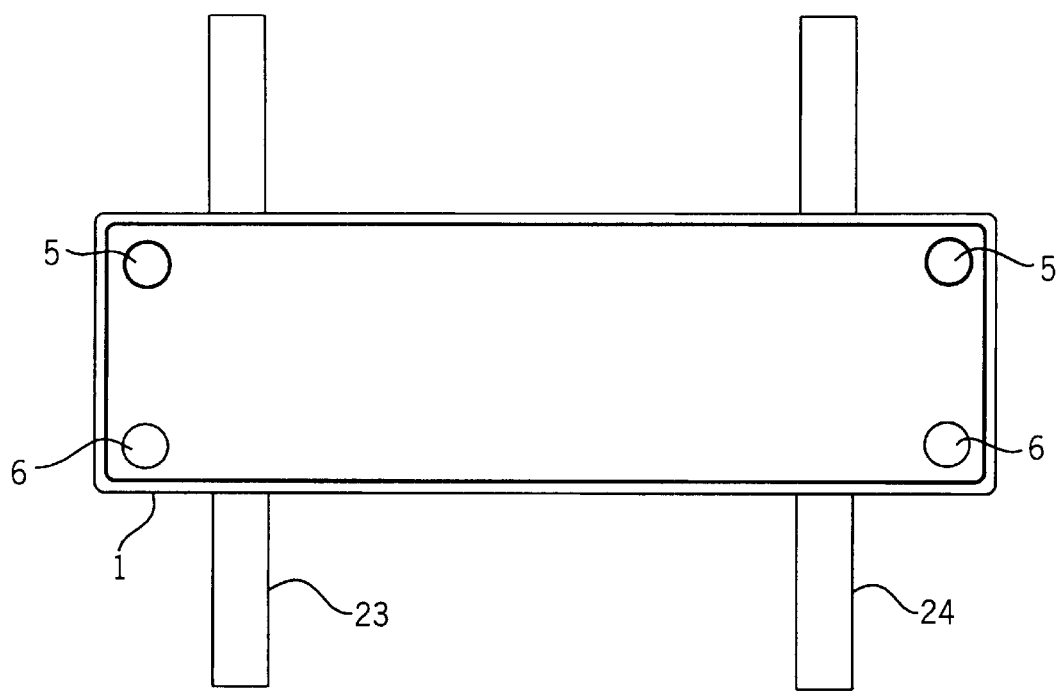
FIG. 9 shows schematically the fitting of an electromagnet to an electrode plate.

FIG. 9 shows a configuration of an electrode 1 adapted for magnetic stimulation of the processes taking place on either side of the electrode. Pole pieces 23, 24 of magnetically conductive material, such as transformer laminations, and with appertaining windings (not shown) form an electromagnet fitted to the edges of the electrode plate 1 made of magnetic material such as certain types of stainless steel. When activating the electromagnet 23, 24 in a known manner a magnetic field is created in the process space between an electrode pair and will stimulate the reaction process.

Figures 10A, 10B:
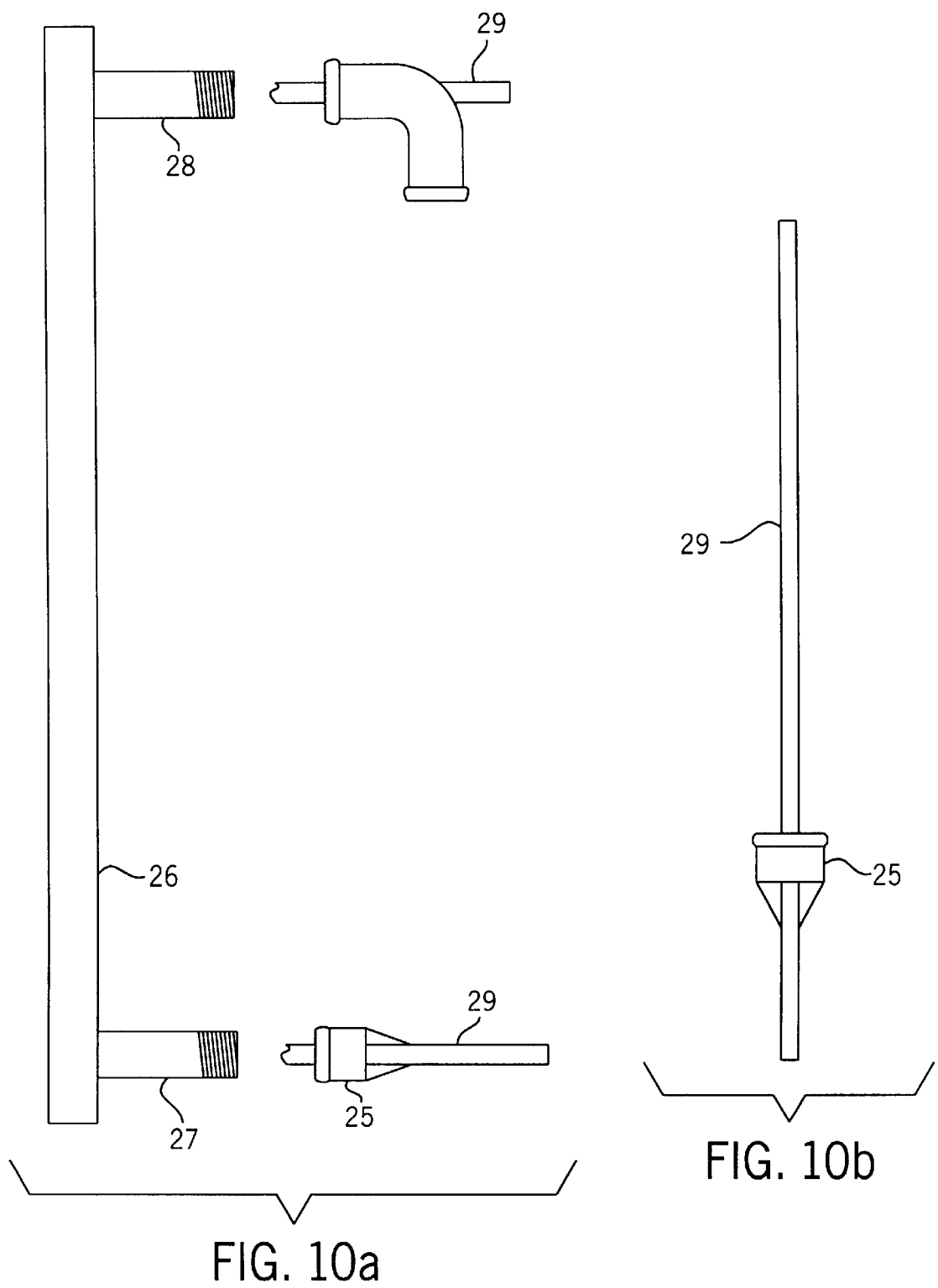
FIG. 10 shows also schematically an ultrasound device and its positioning in a liquid passage way through a unit.

FIG. 10 shows an ultrasonic device for ultrasonic stimulation of the processes within a reactor unit A, B, C, D. With 26 is indicated a longitudinal flow passage formed by the holes 6 (cf. FIG. 5) through a stack of electrode plates or unit and with access to the spaces between the electrode pairs. The flow passage is provided with inlet 27 and outlet 28 pipes for feed or drain of treated liquid.

An ultrasonic transducer 25 mounted on a rod 29 is fitted into the longitudinal flow passage, the length of the rod 29 corresponding to the height of the stack in which the desired stimulation should occur. When activating the transducer 25 ultrasound is spread due to the low losses and high velocity of sound in the treated liquids through the flow passage 26 and from the latter out in to the reaction spaces between the electrodes thus stimulating the process in these spaces. The rod-shaped ultrasonic device 25, 29 is of a size which will allow for passage of liquid through pipes 26, 27, 28 even with the device in mounted position.

Below is given a simple example of the functioning of the reactor according to the invention and with reference especially to FIG. 5. Provided that the four units A, B, C, D are of equal size and each contain 13 electrode reaction spaces, each space being passed by 400 ml/h treated liquid, the flow through each unit is 5.2 L/h and hence the flow through four units is 20.8 L/h in case the four units all work parallel and with the same flow direction. This gives a maximum flow and a minimum physical effect. If the liquid passes in parallel flows and in the same direction through the two lowermost units A, B and then is redirected to pass still in parallel flows, but in the opposite direction through the two uppermost units C, D, the passing liquid mass is reduced by ½, i.e. 10.4 L/h, but the effect is doubled. There are then two parallel and two serial unit flows.

If the liquid flow is passed consecutively and parallely through all four, serially connected units and redirected when passing from one unit to the next following one, which means that the flow passes in the same direction through units A and C and in the opposite direction through units B and D the flow rate of the reactor will be minimum, i.e. that of a single unit of 5.2 L/h, but as the flow passes four times through identical spaces the corresponding effect will be maximum.

In addition to the adjustments of effect due to flow, the adjustments of electrical current density is varied to the desired level by means of the processor. If the physical flow of liquid fed to the reactor is reduced and thus require less processing without changing the needed effect, the liquid volume can simply be reduced to the level needed by exiting the treated liquid through outlets (not shown) in the valve means corresponding to the liquid mass.

From the above it should be understood that the reactor according to the invention represents an extremely versatile apparatus which without undue experimentation is adaptable to any desired liquid purifying process based upon basic principles.

What is claimed is:

1. A method of operating a reactor for removing impurities by electrochemical means from liquids, wherein the reactor defines a liquid inlet and a liquid outlet with a plurality of spaced apart plate shaped electrodes located between the liquid inlet and the liquid outlet for forming at least one liquid flow path within the reactor, said method comprising the steps of:

sensing one or more characteristics of the liquid upstream of the reactor;

passing liquid through the reactor;

controlling the length of the flow path of the liquid within the reactor between the liquid inlet and the liquid outlet in response to the one or more sensed characteristics of the liquid; and generating ultrasonic vibrations in the flow path for stimulating a reaction process taking place in connection with the electrodes.

2. The method of claim 1 wherein the step of controlling the length of the liquid flow path is carried out by selectively altering the positions of one or more valves within the reactor located between the liquid inlet and the liquid outlet.

3. The method of claim 1 further including the step of passing the liquid along the flow path at a speed above a minimum to prevent dissociation of constituent gases but sufficient to ensure interaction with an electrical current passing between the electrodes.

4. The method of claim 1 wherein the sensing step is further defined as sensing at least one of the conductivity of the liquid, the organic content of the liquid, and the flow volume of the liquid.

5. The method of claim 1 further including the step of altering the density of an electrical current passing between the electrodes.

6. The method of claim 1 further including the step of recovering heat from the liquid being treated.

7. The method of claim 1 further including the step of creating a magnetic field around an electrode for stimulating a reaction process taking place in connection with the electrodes.

8. The method of claim 1 wherein the reactor comprises a plurality of interconnected units each having a liquid inlet, a liquid outlet and a plurality of spaced apart, plate shaped electrodes forming at least one liquid flow path within the unit, said method further comprising the step of selectively activating or deactivating one or more units in response to the one or more sensed characteristics of the liquid.

* * * * *